United States Patent
Marinoni et al.

(10) Patent No.: US 6,173,740 B1
(45) Date of Patent: Jan. 16, 2001

(54) HIGHLY VERSATILE FLUID-ACTUATED VALVE CONTROL ACTUATOR

(75) Inventors: Antonio Marinoni; Ignazio Paris, both of Grumello Del Monte; Santo Rota, Albano Sant' Alessandro; Libero Trapletti, Grone, all of (IT)

(73) Assignee: Air Torque S.p.A., Albano S. Alessandro (IT)

( * ) Notice: Under 35 U.S.C. 154(b), the term of this patent shall be extended for 0 days.

(21) Appl. No.: 09/404,787

(22) Filed: Sep. 24, 1999

(30) Foreign Application Priority Data

Mar. 2, 1999 (IT) .............................. MI99A0424

(51) Int. Cl.⁷ .................................................. F16K 37/00
(52) U.S. Cl. ............................ 137/554; 251/31; 251/250
(58) Field of Search .................... 251/31, 250; 137/554, 137/556

(56) References Cited

U.S. PATENT DOCUMENTS

| | | | |
|---|---|---|---|
| 3,104,862 | * 9/1963 | Pearson et al. | 251/250 |
| 3,107,080 | * 10/1963 | Priese | 251/250 |
| 3,452,961 | * 7/1969 | Forsman | 251/31 |
| 3,982,725 | 9/1976 | Clark . | |
| 4,046,350 | * 9/1977 | Massey et al. | 251/58 |
| 4,260,128 | * 4/1981 | Tito | 251/250 |
| 4,597,556 | * 7/1986 | Sandling | 251/58 |

FOREIGN PATENT DOCUMENTS

| | | |
|---|---|---|
| 1329562 | 9/1973 | (GB) . |
| 2102887 | 2/1983 | (GB) . |

* cited by examiner

Primary Examiner—A. Michael Chambers
(74) Attorney, Agent, or Firm—Guido Modiano; Albert Josif; Daniel O'Byrne

(57) ABSTRACT

A fluid-actuated valve control actuator, comprising a body in which two mutually opposite pistons are accommodated, each piston being provided with a rack and being adapted to engage a shaft for actuating a stem of a valve, wherein an end of the actuation shaft that lies opposite to an end adapted to engage the stem of valve is octagonal for engagement with an indicator for indicating the opening/closure of the valve.

4 Claims, 2 Drawing Sheets

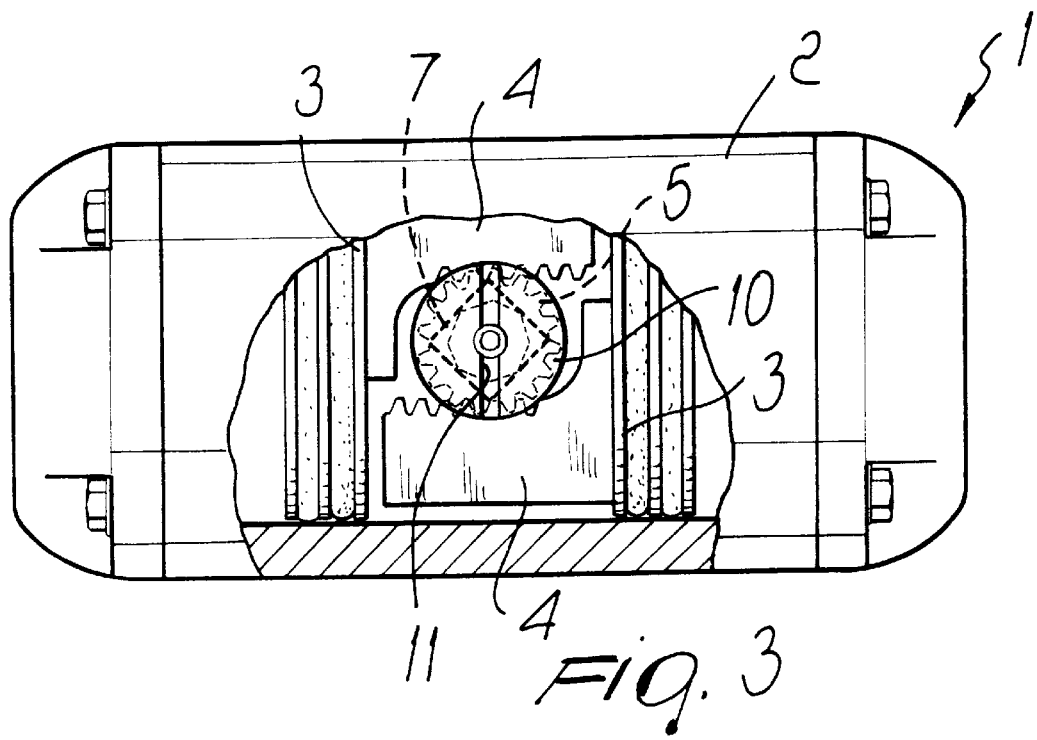
Fig. 3
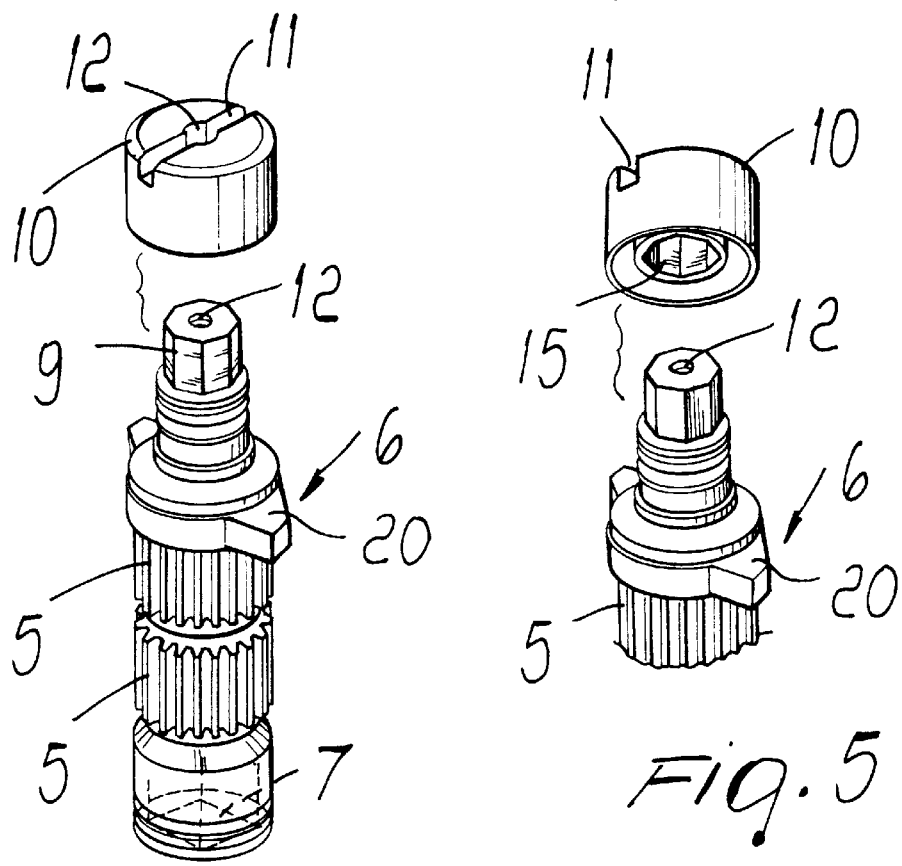
Fig. 4
Fig. 5

HIGHLY VERSATILE FLUID-ACTUATED VALVE CONTROL ACTUATOR

BACKGROUND OF THE INVENTION

The present invention relates to a highly versatile fluid-actuated valve control actuator.

More particularly, the invention relates to a fluid-actuated valve control actuator which adapts to both European and US standards.

It is known that industrial valves are usually controlled by using fluid-actuated actuators which are constituted by two mutually opposite pistons, each provided with a rack whose teeth engage a shaft arranged at right angles to the translatory motion that the pistons can perform.

The translatory motion of the pistons as a consequence of the feeding of a fluid, such as for example air or oil, causes the rotation of the shaft, which is connected to the stem of a valve to be opened or closed by the actuator.

In this manner, the actuation of the pistons allows to open or close the valve controlled by the actuator.

The ISO standard prescribes that the valve stem must engage in a square seat which is formed at the lower end of the shaft and is arranged so that its sides are respectively parallel and perpendicular to the direction of the translatory motion of the pistons.

The European standard allows (as is preferable) the option of having the seat at a 45° angle with respect to the direction of motion of the pistons that engage the shaft by means of their rack.

Accordingly, due to the two different standards it is necessary to produce shafts having different configurations.

The shaft for actuating the valve stem controlled by the fluid-actuated actuator in fact has, at the opposite end for engagement with the valve stem, indicator means which allow the operator to check the actual position of the controlled valve.

For this purpose, the indicator means arranged at the upper end of the shaft, which lies furthest from the end for engagement with the valve stem, are preset differently depending on whether they must indicate the opening of a valve according to European standards or the opening of a valve according to US standards.

Of course, this fact entails an increase in production costs, since it is necessary to take into account the two types of standard in the production of the shafts and of the corresponding indicator means.

One solution to this type of drawback has been to provide the end of the shaft that engages the valve stem with an octagonal seat, so as to adapt to the two types of standard.

However, this solution is unsatisfactory from the point of view of the engagement between the seat of the shaft and the stem of the valve to be controlled, since the forces applied by the shaft to the valve stem by virtue of the actuation of the pistons of the fluid-actuated actuator can cause slippage of the shaft seat on the valve stem, accordingly preventing the appropriate actuation of said valve.

SUMMARY OF THE INVENTION

The aim of the present invention is to provide a fluid-actuated valve control actuator which can be adapted to the different types of currently applicable valve stem control standard.

Within the scope of this aim, an object of the present invention is to provide a fluid-actuated valve control actuator in which the engagement between the shaft seat and the stem of the valve to be controlled is always optimum, regardless of the type of standard applicable to the orientation of the valve stem engagement seat.

Another object of the present invention is to provide a fluid-actuated valve control actuator in which the means for indicating the position of the valve to be controlled are the same regardless of the type of standard to be met by the seat for the engagement of the shaft with the stem of the valve to be controlled.

Another object of the present invention is to provide a fluid-actuated valve control actuator which is highly reliable, relatively easy to provide and at competitive costs.

This aim, these objects and others which will become apparent hereinafter are achieved by a fluid-actuated valve control actuator which comprises a body in which two mutually opposite pistons are accommodated, each piston being provided with a rack and being adapted to engage a shaft for actuating a stem of a valve, characterized in that an end of said actuation shaft that lies opposite to an end adapted to allow engagement with said stem is octagonal for engagement with means for indicating the opening/closure of said valve.

BRIEF DESCRIPTION OF THE DRAWINGS

Further characteristics and advantages of the invention will become apparent from the description of preferred but not exclusive embodiments of the fluid-actuated actuator according to the invention, illustrated by way of non-limitative example in the accompanying drawings, wherein:

FIG. 3 is a partially sectional cutout plan view of the fluid-actuated actuator in a second embodiment according to the present invention;

FIG. 4 is an exploded perspective view of the actuation means of the stem of a valve, provided in the fluid-actuated actuator according to the present invention; and FIG. 5 is a further perspective view of the actuation means shown in FIG. 4.

DESCRIPTION OF THE PREFERRED EMBODIMENTS

Figure 1:
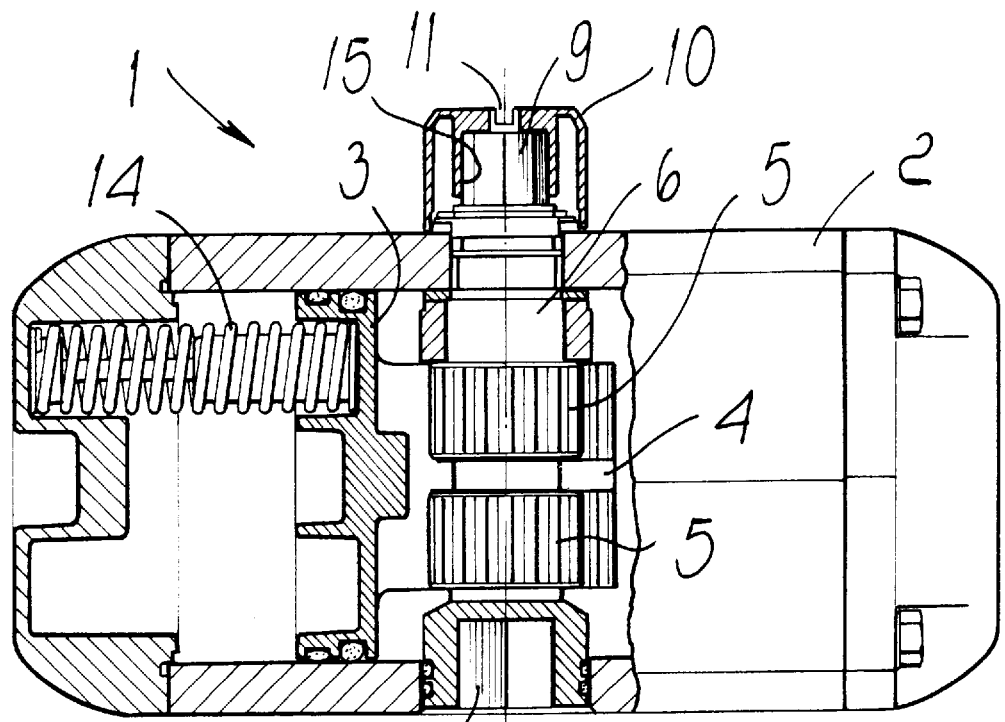
FIG. 1 is a transverse sectional view of a fluid-actuated actuator according to the present invention.

With reference to the above figures, the fluid-actuated actuator according to the present invention, generally designated by the reference numeral 1, comprises a body 2 for accommodating two mutually opposite pistons 3, each provided with a rack 4 for engaging a respective pinion 5 formed in an intermediate portion of a shaft 6 for the actuation of a stem of a valve to be controlled by means of the actuator.

Figure 2:
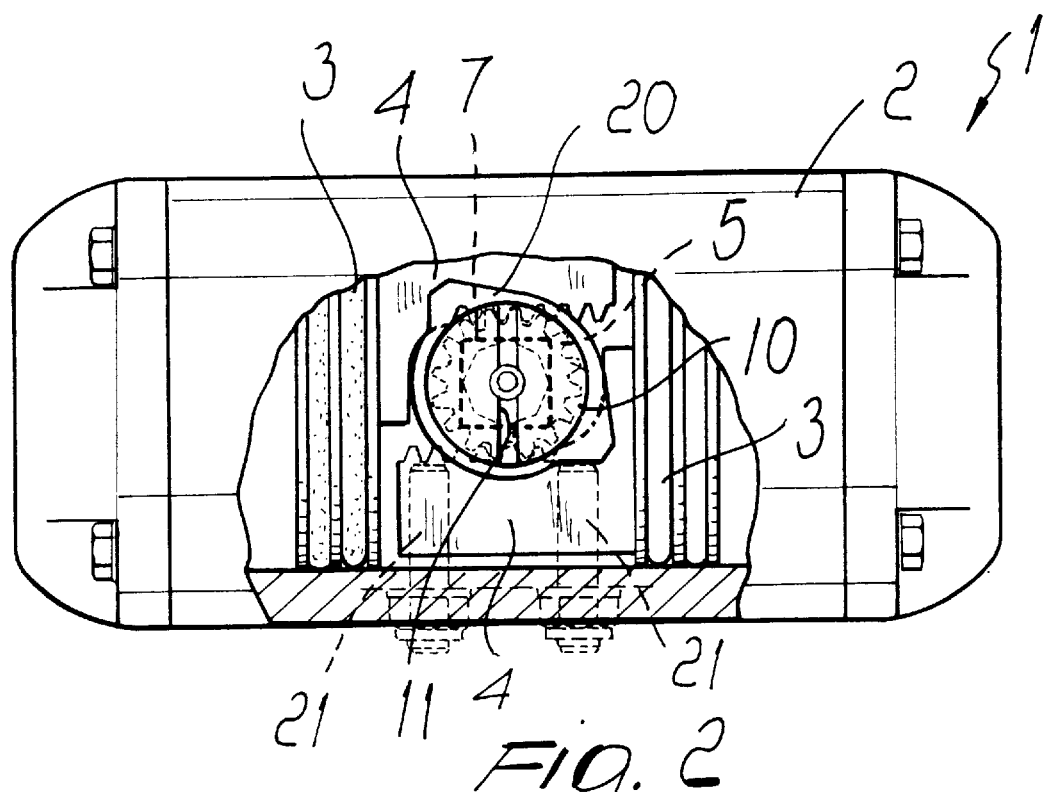
FIG. 2 is a partially sectional cutout plan view of the fluid-actuated actuator in a first embodiment of the invention.

The shaft 6 is provided, in a downward region, with a seat 7 for engaging the stem of a valve (not shown), which has a square profile and can be arranged either so that its sides are parallel and perpendicular to the direction of the movement of the pistons 3, as shown in FIG. 2, or at a 45° angle with respect to the direction of the movement of said pistons 3.

The particularity of the invention resides in the fact that the upper end of the shaft 6, arranged opposite the end in which the seat 7 is formed, is octagonal and is designated by the reference numeral 9.

The octagonal upper end 9 of the shaft 6 is coupled to means 10 for indicating the open or closed state of the controlled valve.

The indicator means 10 are conveniently configured as a cap which is adapted to couple to the octagonal end 9 of the shaft 6 and are provided in an upward region with a slot 11 which is meant to allow visual checking of the condition of the controlled valve and to move the shaft/connector of the control accessories. The slot 11 has a wider central portion 12 through which there pass engagement means adapted to fix the indicator means 10 to the octagonal end 9 of the shaft 6 by insertion in a hole 12 formed in the octagonal end 9 of the shaft 6.

In this manner, the indicator means 10 can be coupled to the end 9 of the shaft 6, choosing their initial orientation according to the coupling provided between the seat 7 of the valve 6 and the valve stem.

Therefore, regardless of compliance with European or ISO standards, the shaft 6, whatever its orientation with the corresponding seat 7 with respect to the direction of motion of the pistons 3, has associated indicator means 10 which can be orientated accordingly, so that it is not necessary to provide specific shafts 6 and corresponding indicator means 10 depending on the type of standard to be met.

Conveniently, the indicator means 10 have a seat 15 for coupling to the octagonal upper end 9 of the shaft 6; said seat also is octagonal so as to allow engagement with the octagonal end 9.

Conveniently, in order to clearly indicate the state of the valve to be controlled, the slot 11, which already has the function of indicating the condition of the valve, can be used by inserting additional indicator means which are more clearly visible from a distance.

FIG. 1 illustrates one of the pistons 3 with which elastic means 14 are associated which allow the return stroke of said piston following an interruption of fluid-actuated actuation. It is of course also possible to provide double-stroke pistons 3, i.e., pistons in which the stroke of the piston is determined by the injection of fluid for both directions.

Conveniently, the shaft 6 has rotation-limiting means 20 which are keyed thereon and are adapted to abut against two abutment elements 21 in order to limit the rotation of the shaft 6.

In practice it has been observed that the fluid-actuated actuator according to the invention fully achieves the intended aim and objects, since it allows to provide a single type of actuation shaft with corresponding indicator means regardless of the applicable standard to be met.

Furthermore, the square engagement seat of the shaft for engaging the valve stem allows better transmission of forces for opening or closing the valve.

Furthermore, since compliance with the standards entails exclusively a different orientation of the shaft and therefore of the corresponding seat for engagement with the valve stem, installation of the actuator according to the invention is particularly quick, since the coupling of the indicator means to the octagonal end of the valve stem actuation shaft merely requires orientating said means before positioning them on said octagonal end.

The fluid-actuated actuator thus conceived is susceptible of numerous modifications and variations, all of which are within the scope of the inventive concept; all the details may furthermore be replaced with other technically equivalent elements.

In practice, the materials used, so long as they are compatible with the specific use, as well as the dimensions, may be any according to requirements and to the state of the art.

The disclosures in Italian Patent Application No. MI99A000424 from which this application claims priority are incorporated herein by reference.

What is claimed is:

1. A fluid-actuated valve control actuator comprising:

a valve body;

two mutually opposite pistons slidably accommodated in said valve body;

an actuation shaft rotatably accommodated in said valve body, each piston being provided with a rack engaging said actuation shaft for actuating a stem of a valve, said actuation shaft having a first end provided with an engagement seat having a square cross-section for accommodating said stem of said valve;

a second end of said actuation shaft that lies opposite to said first end, said second end having an octagonal cross-section; and a cap element for indicating the opening/closure of said valve, said cap element having an octagonal-shaped seat selectively engaged with said octagonal cross-section second end of said actuation shaft.

2. The fluid-actuated actuator according to claim 1, wherein said cap element is provided, in an upward region, with a slot for visually indicating the position of the valve actuated by said actuation shaft.

3. The fluid-actuated actuator according to claim 1, wherein the octagonal cross-section second end of said actuation shaft has a hole for fixing said cap element.

4. The fluid-actuated actuator according to claim 1, wherein said actuation shaft has rotation-limiting means which are keyed thereon and are adapted to abut against two abutment elements connected to said valve body.

* * * * *